Feb. 28, 1961 N. ZROLKA 2,973,151
SHOWER SPRAY
Filed Jan. 28, 1959 2 Sheets-Sheet 1
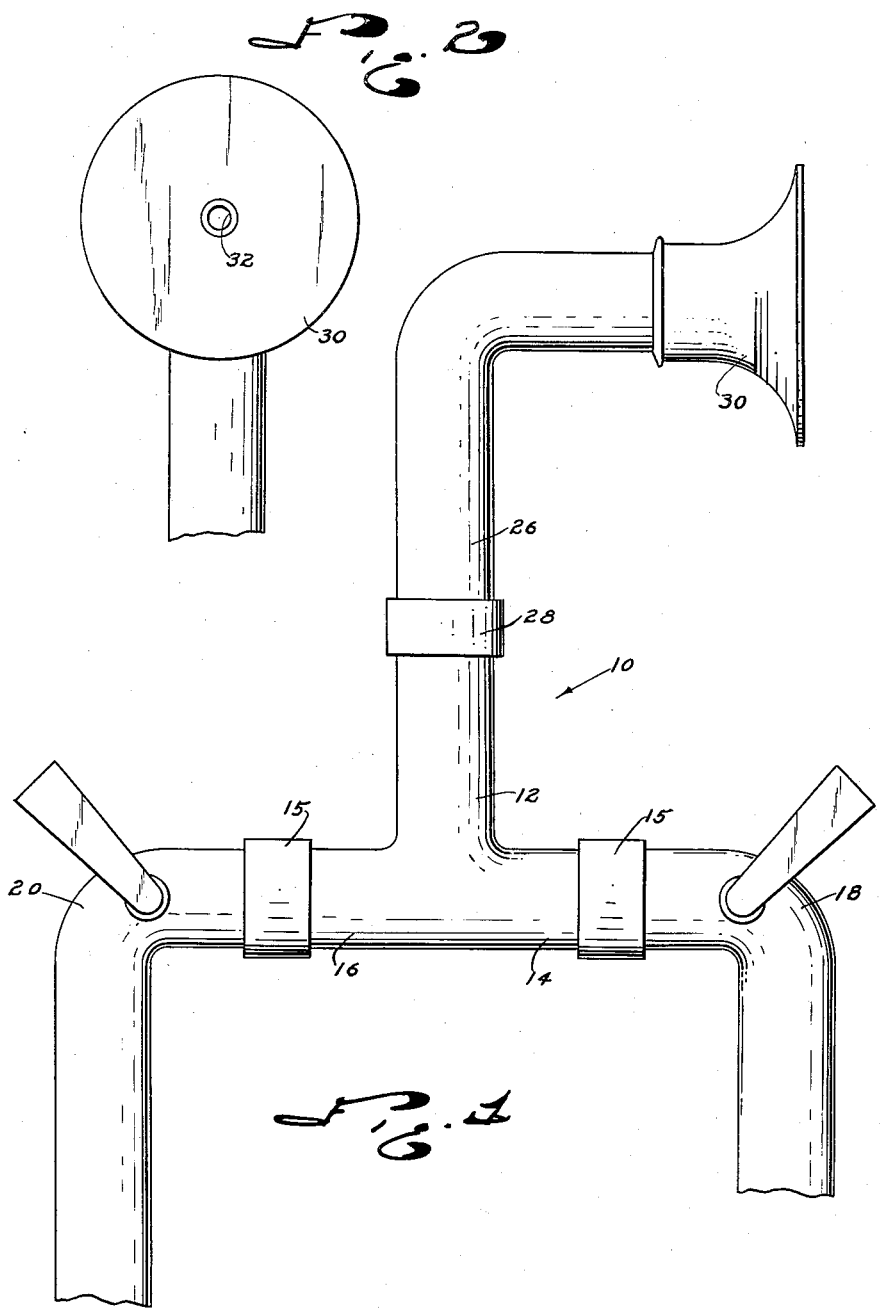
INVENTOR.
NICHOLAS ZROLKA

United States Patent Office 2,973,151
Patented Feb. 28, 1961

2,973,151
SHOWER SPRAY

Nicholas Zrolka, Detroit, Mich., assignor of one-tenth to Gadget-Of-The-Month Club, Inc., North Hollywood, Calif., a corporation of California Filed Jan. 28, 1959, Ser. No. 789,738

1 Claim. (Cl. 239—432)

This invention relates to plumbing fixtures and more particularly to a shower spray assembly.

It is an object of the present invention to provide a hot and cold water mixer for spray showers that will effectively and thoroughly mix the hot and cold water together before it is sprayed outwardly through the spray nozzle of the shower.

Another object of the present invention is to provide a hot and cold water mixer type shower unit that can be effectively installed on all existing spray shower units and which can be easily controlled through manipulation of conventional type hot and cold water valves.

Still another object of the present invention is to provide a shower spray unit of the above type which will provide for more even control of the hot and cold water in the shower unit and prevent sudden changes of temperature in the water passing outwardly through the spray nozzle thereof.

Other objects of the invention are to provide a shower spray bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a shower spray unit made in accordance with the present invention in operative use;

Figure 2 is a front elevational view of the spray nozzle portion of the apparatus shown in Figure 1.

Figure 3:
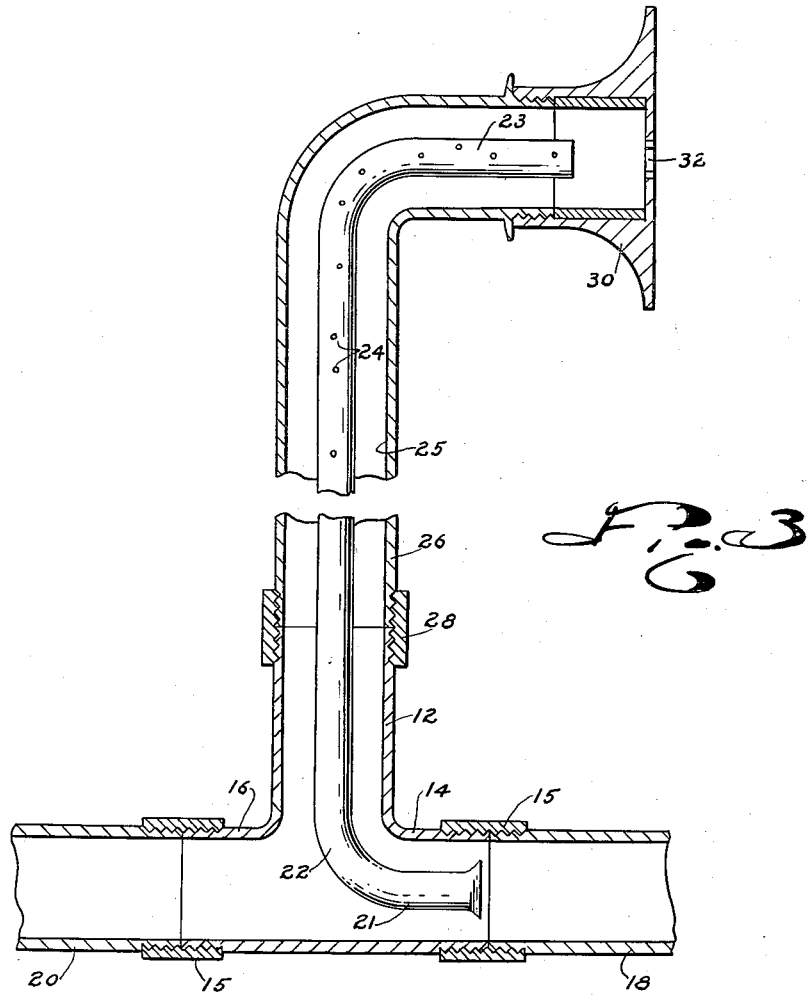
Figure 3 is a fragmentary longitudinal cross sectional view of the assembly shown in Figure 1.

Referring now to the drawing, and more particularly to Figures 1 and 2 thereof, a hot and cold water mixer unit made in accordance with the present invention for use with spray shower installations, is shown to include a main fitting of substantially T-shaped configuration having a stem 12 and an integral crosshead having terminal portions 14, 16 for connection to hot and cold water valve units 18, 20, such as by sleeves 15. An elongated pipe 22 having angularly related terminal portions 21, 23, and being constructed of a material having a high coefficient of heat conductivity, such as copper, is disposed within the main fitting with one end 21 thereof opening toward the hot water valve 18 for receiving hot water therethrough. The upper portions of this pipe 22 are provided with perforations 24 so as to provide communication between the interior of the pipe 22 and the interior 25 of an extension sleeve 26 that is sealingly engaged to the stem 12 of the T-shaped fitting, such as by a collar or ring 28. A spray nozzle 30 having an outlet 32 is threadedly carried by the upper free end of the extension sleeve 26, as is clearly shown in Figure 3 of the drawing.

In actual use, the manually operated valves 18, 20 are used to control the quantity of hot and cold water passing into the interior of the T-shaped fitting and extension sleeve. However, some of the hot water is directed into the open end 21 of the pipe 22 and caused to pass upwardly through the perforated portion thereof and outwardly toward the nozzle 30 in spaced relationship with the outlet 32. During this flow of the hot water, within the pipe 22, some of the water is caused to pass outwardly through the perforations 24 into further mixing relationship with the partially mixed hot and cold water passing upwardly through the interior 25 of the sleeve 26, so that by the time all of the water reaches the vicinity of the outlet 32 of the nozzle, it is thoroughly mixed and of generally constant temperature. In addition, since the pipe 22 is of high thermo-conductivity, the hot water passing therethrough further heats the cold water passing within the interior 25 of the sleeve 26 and around the exterior of the perforated pipe 22. The thorough mixing of the water in this way, thus prevents rapid changes in the water temperature and provides for more even temperature control at all times.

While various changes may be made in the detail construction, it shall be understood that such changes shall be within the spirit and scope of the present invention as defined by the appended claim.

Having thus described my invention, I claim as new and desire to secure by Letters Patent:

A hot and cold water mixer for spray showers comprising, in combination, a main fitting of substantially hollow T-shaped configuration having a crosshead terminating at each end thereof in terminal portions and having a hollow stem perpendicularly connected to a center part of said crosshead, said terminal portions of said crosshead each being provided with a separate individually controlled manually operated valve connected thereto and to a source of hot water at one end of said crosshead and to a source of cold water at the other end of said crosshead, mixing means having one end connected to said hollow stem, a spray nozzle connected to the opposite end of said mixing means, said mixing means comprising a pipe having a flared inlet end concentrically positioned in said crosshead in spaced relationship with and adjacent to the manually operated valve controlling the flow of hot water from the hot water source, and having a perpendicularly related intermediate portion concentrically positioned within said hollow stem and said connected mixing means, and being provided with a plurality of perforations positioned within said mixing means and in communication with the interior of said mixing means, and being provided with an end portion perpendicularly related with respect to said intermediate portion and extending into the interior of said spray nozzle whereby to effectively mix water from the hot and cold water sources and effectively provide heat transfer therebetween in a manner controlled by the relative settings of the two manually controlled valves.

References Cited in the file of this patent

UNITED STATES PATENTS

| 154,544 | Doten | Sept. 1, 1874 |
| 1,101,264 | Eneas | June 23, 1914 |
| 1,546,752 | Rohr | July 21, 1925 |
| 2,054,964 | Barker | Sept. 22, 1936 |
| 2,325,242 | Gordon | July 27, 1943 |
| 2,828,766 | Postmus | Apr. 1, 1958 |